United States Patent [19]

Malot et al.

[11] Patent Number: 5,759,250

[45] Date of Patent: Jun. 2, 1998

[54] USE OF A VERY HARD ASPHALT BINDER IN THE PREPARATION OF A ROAD ASPHALT INTENDED IN PARTICULAR FOR ROAD BED FOUNDATIONS

[75] Inventors: Michel Malot, Bolbec; Yannick Jolivet, Le Havre, both of France

[73] Assignee: Total Raffinage Distribution, S.A., Puteaux, France

[21] Appl. No.: 697,297

[22] Filed: Aug. 26, 1996

[30] Foreign Application Priority Data

Aug. 25, 1995 [FR] France ................... 95 10097

[51] Int. Cl.[6] .............................................. L09D 195/00
[52] U.S. Cl. .............................................. 106/281.1
[58] Field of Search ................................... 106/281.1

[56] References Cited

U.S. PATENT DOCUMENTS 4,371,401  2/1983  Langumier ................ 106/281

4,810,367  3/1989  Chombart et al. ................ 208/309

FOREIGN PATENT DOCUMENTS

| 0 041 881 | 12/1981 | European Pat. Off. | C08L 95/00 |
| 0 482 971 | 4/1992 | European Pat. Off. | C08L 95/00 |
| 2 227 294 | 11/1974 | France | C08H 13/00 |
| 2 483 938 | 12/1981 | France | C08L 95/00 |

*Primary Examiner*—David Brunsman
*Attorney, Agent, or Firm*—Frommer Lawrence & Haug LLP; A. Thomas S. Safford

[57] ABSTRACT

The use of an asphalt having a penetrability at 25° C. from 0 to 20 in the preparation of a road asphalt (i.e. a mixture of asphalt and mineral aggregate) intended in particular for building and strengthening roadbeds. Wherein, the asphalt content of the road asphalt is higher than 6 wt %. Also the road asphalt having such composition.

20 Claims, No Drawings

USE OF A VERY HARD ASPHALT BINDER IN THE PREPARATION OF A ROAD ASPHALT INTENDED IN PARTICULAR FOR ROAD BED FOUNDATIONS

RELATED APPLICATION

This application claims priority to French Application No. 95 10097, filed Aug. 25, 1995, incorporated herein by reference.

BACKGROUND OF THE INVENTION

1. Field of the Invention

The present invention concerns the use of a very hard asphalt binder in the preparation of a road asphalt intended in particular for roadbed foundations.

2. Description of the Related Art

It is known that asphalt can be obtained, in particular, from crude petroleum by distillation and/or by deasphalting the heavy fraction obtained by distillation (or distillations). Depending on the origin of the crude petroleum, asphalt consists of varying amounts of saturated paraffinic, naphthenic or aromatic oils, resins and asphaltenes (for more details, refer to European Patent EP 246 956 and its equivalent U.S. Pat. No. 4,810,367 granted to Applicants' assignee, the disclosure of which is incorporated by reference).

It is also known that road asphalts are compositions obtained from asphalt and mineral aggregates, the asphalt serving as binder to ensure the cohesion of the material.

By resistance to rutting of a material is meant the ability to resist [plastic] flow phenomena caused by traffic, particularly heavy and slow traffic, under hot climatic conditions.

Resistance to mechanical fatigue of a material is the ability to resist tensile stresses generated by traffic under average or cold climatic conditions.

It is known that hard asphalts, namely those with a penetrability at 25° C. from 10 to 25 and a softening temperature higher than 60° C., referred to as "ball-and-ring" temperature because of the method used to measure it, are obtained, in particular, from crude petroleum by direct distillation and/or by deasphalting.

Although, when used for the preparation of road asphalts, hard asphalt confers to said road asphalt the desired properties such as resistance to rutting and resistance to fatigue, it is known that the harder the asphalt the greater is the risk that mechanically and/or thermally induced cracks will appear in the road asphalt.

Thus, the use of hard asphalt poses problems well known to professionals working in the road-building field. Hence, finding solutions to these problems is one of their present concerns.

This is why some industrial organizations, for example the Society for Road Work and Materials in its patent FR 2 483 938 (see also the equivalent U.S. Pat. No. 4,371,401), have proposed to use these hard asphalts in the preparation of road asphalts intended for the construction of roads. This patent (which is also incorporated herein by reference), in fact, discloses a novel asphalt blend for road uses which utilizes an asphalt having a penetrability at 25° C. from 5 to 20, a hot-mixing temperature of 175° C. and a modulus of rigidity from $16 \times 10^3$ to $24 \times 10^3$ MPa.

It is known, however, that when the penetrability at 25° C. is less than 10 and the modulus of rigidity of the road asphalt is higher than $24 \times 10^3$ MPa the asphalt is considered to be too hard for practical use. Until now, therefore, this type of asphalt has not found use in road applications.

OBJECTS AND SUMMARY OF THE INVENTION

While pursuing its research work in this field and contrary to the teachings of the prior art, Applicants have surprisingly found that hereinafter it will be possible to use very hard asphalts for the preparation of road asphalts provided the asphalt content of the road asphalt is higher than that recommended by the prior art. Thus, Applicants have established that such high contents of very hard asphalt make it possible to use road asphalt layers that are thinner than usual.

Hence, a purpose of the present invention is to enhance the value of very hard asphalts by using them in the production of road asphalts intended in particular for roadbed foundations and thus to solve the problem of finding a use for them.

To this end, a first embodiment of the present invention uses a very hard asphalt with a penetrability at 25° C. from 0 to 20 in the preparation of a road asphalt with a modulus of rigidity greater than $24 \times 10^3$ MPa intended in particular for building or strengthening roadways, characterized by the fact that the asphalt content of said road asphalt is higher than 6 wt %.

Another embodiment of the invention is a road asphalt intended in particular for building or strengthening roadways, characterized by the fact that it contains more than 6 wt % of an asphalt with a penetrability at 25° C. from 0 to 20.

For purposes of defining these embodiments of the invention and in the continuation of the present description, penetrability is measured in accordance with AFNOR[1] method NFT 66-004 and the modulus of rigidity is determined by TOTAL method 762-94 see Bulletin de Liasion des Laboratorie Central des Ponts et Chaussées" No. 116, November–December 1981, ref. 2627, including page 33; a comparative study of the tests for measuring very hard asphalt binder used by the participating companies, namely, BP, Esso, LOPC, Mobil, Shell, and Total].

[1] Association Francaise de Normalisation=French Society for Standardization.

For purposes of the present invention, the asphalt acting as binder can be either a "natural" or a "synthetic" asphalt. Natural asphalt can be obtained from crude petroleum, bituminous schists, heavy oils or bituminous sand.

Natural asphalt can be, for example, a) the heaviest fraction obtained by direct distillation of a crude petroleum at atmospheric or reduced pressure;

b) the heavy phase obtained by solvent-deasphalting of a heavy fraction described under a);

c) the product of oxidation, obtained in the presence or absence of a catalyst, of a heavy fraction as obtained under a) or of a heavy phase as obtained under b);

d) the product of oxidation, obtained in the presence or absence of a catalyst, of a blend of a heavy fraction as obtained under a) or of a heavy phase as obtained under b) and
 - a distillate, or
 - an aromatic extract obtained in the dearomatization of lubricating oils, or
 - a deasphalting pitch;

e) a blend of an oxidized product obtained as under c) and d) or of a hard phase; and
 - a distillate; or
 - an aromatic extract obtained in the dearomatization of lubricating oils; or

- a deasphalting pitch; or
- a heavy fraction obtained as under a) or a heavy phase as obtained under b);

f) a visbroken base, alone or blended with one or more of the afore-listed products;

g) one of the products obtained as under a) and f), blended with
- a distillate; or
- an aromatic extract obtained in the dearomatization of lubricating oils; or
- a deasphalting pitch; or
- a heavy aromatic fraction (catalytic slurry) from a catalytic cracking process.

Also suitable are synthetic asphalts with properties close to those of a "natural" asphalt described hereinabove, for example, clear synthetic binders that can be colored by addition of pigments. Such asphalts can consist, for example, of petroleum resins or coumarone-indene resins, blended with aromatic and/or paraffinic hydrocarbons. Such petroleum resins can be prepared by polymerization of unsaturated hydrocarbons present in unsaturated petroleum fractions, such as the fractions obtained by thermal or steam cracking or by pyrolysis. The coumarone-indene resins, on the other hand, are generally obtained from coal tar.

The asphalt selected to act as binder, regardless of type, will be very hard and have a penetrability from 0 to 10 to give a road asphalt with a modulus of rigidity higher than $24 \times 10^3$ MPa.

DESCRIPTION OF THE PREFERRED EMBODIMENTS

The asphalt used according to the invention is prepared by simple blending or by blowing a blend of different constituents. In particular, Applicants have thus tested successfully a blend of an asphalt obtained from a hard base produced by direct distillation and having a penetrability from 15 to 25 and a heavy fraction obtained by distillation of crude petroleum at atmospheric or reduced pressure or of products obtained by a process such as catalytic or thermal cracking. This heavy fraction is preferably such that during its distillation less than 5% of distillate is formed at a temperature equal to or higher than 350° C, and preferably 400° C.

All distillations mentioned hereinabove were carried out by ASTM method D 1160.

A mineral aggregate preferably used for the preparation of the road asphalt has a particle size from, for example, 0/14 to 0/20 and may consist of a mixture of fine gravel, sand and filler. The characteristics of said aggregate meet the requirements of standard P18-101.

Applicants have thus used successfully a composition named "Meilleraie materials" which has a particle size of 0/14 and the following formulation:

| 42% of sand | 0/2 |
| 10% of fine gravel | 2/4 |
| 10% of fine gravel | 4/6 |
| 13% of fine gravel | 6/10 |
| 23% of fine gravel | 10/14 |
| 2% of a filler. | |

The road asphalt was prepared by blending the asphalt and the mineral aggregate at a temperature from 180° to 200° C. at a rate of 30 to 500 rpm and under hot-mixing conditions that did not require a specific material.

The road asphalt was then compacted to correctly incorporate the asphalt into the mineral aggregate and thus attain optimum mechanical properties.

The asphalt used to reduce the invention to practice may contain from 6 to 8 wt % of asphalt in the road asphalt, which is clearly beyond the maximum value of 6 wt % recommended by the prior art. Applicants have in fact found that by using a very hard asphalt, the proportion of asphalt in roadways can now be increased, which is advantageous in terms of mechanical and thermal performance.

This high asphalt content P is calculated from the conventional expression $P = K^5 \sqrt{\Sigma} \cdot \alpha$, where P denotes the asphalt content of the road asphalt, expressed in wt %, K denotes the modulus of "richness", $\Sigma$ denotes the conventional specific surface of the aggregate and $\alpha$ is the ratio $$\frac{2.65}{\text{density of the aggregate}}.$$

The modulus of "richness" K then has a value from 3.8 to 4.5. The compactness of the road asphalt (aggregate content of the road asphalt) is greater than 95% to ensure optimum mechanical properties.

In fact, an insufficient amount of asphalt in the road asphalt causes cracking problems at all levels of the roadway, whereas an excessively high amount of asphalt causes road rutting problems. An amount of asphalt according to the invention, on the other hand, facilitates self-repair.

According to the invention, the foundation layer of road asphalt can be 5 to 30 cm thick. This constitutes a significant advantage over the conventional thickness of the prior-art road asphalts which, as shown in the following examples, is about 40 to 50 cm. Thus, a smaller amount of road asphalt is needed for building the roadbed, which results in a net reduction of construction costs.

The roadbed foundation layers most frequently described by the prior art consist of material treated with hydraulic binders particularly the cement aggregate or slag aggregate, or a road asphalt of the asphalt aggregate type.

By "cement aggregate" is meant a material containing a mixture of aggregates, for example sand, fine gravel or filler, and cement.

By "slag aggregate" is meant a material containing a mixture of aggregates, for example sand, fine gravel or filler, and slag.

By "asphalt aggregate" is meant a material containing a mixture of aggregates, for example sand, fine gravel or filler, and asphalt.

$\sigma_6$ is the stress at which the test specimen breaks after $10^6$ cycles in the test by TOTAL method 762-94.

$\epsilon_6$ is the deformation at which the test specimen breaks after $10^6$ cycles in the test by TOTAL method 762-94.

The materials treated with hydraulic binders exert an advantageous effect on the road structure, because the presence of cement or slag confers to such materials a high modulus of rigidity from about $15 \times 10^3$ to about $35 \times 10^3$ MPa. Fatigue resistance will result in a $\sigma_6$ value of about 0.85 MPa. This effect, however, is attained only after a relatively long setting time of several weeks. Thermally induced cracking is also noted.

The road asphalts of the asphalt aggregate type as per NFP standard 98-138, because of their viscoelastic character imparted by the presence of asphalt, are known to have the advantage of conferring deformation capabilities which are reflected in a fatigue resistance of at least $0.8 \times 10^{-4}$, but their modulus of rigidity rarely exceeds $11 \times 10^3$ MPa at 15° C. and 10 Hz. The modulus of rigidity is measured by NFP method 98-260 2.

As shown in the following examples, by use of a very hard asphalt according to the invention it is possible to impart to the road asphalt the rigidity properties of materials treated with hydraulic binders and at the same time the viscoelastic properties of road asphalts.

In fact, said road asphalts present a modulus of rigidity greater than $24 \times 10^3$ MPa at 15° C. and 10 Hz, a fatigue resistance at an applied stress resulting in a $\sigma_6$ value between 1 and 2.5 MPa at 15° C. and 25 Hz and a fatigue resistance at an applied deformation resulting in an $\epsilon_6$ value greater than $0.8 \times 10^{-4}$.

Such properties are indispensable for a roadbed foundation layer which must ensure, within the entire roadbed, good distribution of stresses and deformations generated by road traffic at the surface.

This roadbed foundation layer will be placed, for example, between the natural ground or an untreated coarse gravel placed on the ground and the top layer which is in direct contact with the vehicles. The use, according to the invention, of a very hard asphalt for the preparation of a road asphalt intended for roadbed foundations is valuable for both new road constructions and for the strengthening of existing ones.

At any rate, in road applications, such a road asphalt can only serve as foundation layer, because it does not have sufficient adherence properties and because it does not present a closed, smooth surface without holes and roughness. This foundation layer must therefore be covered by a top layer which may consist of a conventional road asphalt, for example an asphalt concrete. This top layer has the function of ensuring good thermal protection and, through its roughness, good adherence by all vehicles. Such a road asphalt can also be used as an industrial floor material capable of supporting heavy loads and anchoring.

The following examples illustrate the invention without limiting it.

EXAMPLE 1

The purpose of this example is to demonstrate the use, according to the invention, of a very hard asphalt in the preparation of a road asphalt as foundation material, more particularly in the construction of new roadways.

A conventional roadway was made by use of the following materials: one top layer of asphalt concrete applied on top of two layers of cement aggregate (material treated with hydraulic binders), which in turn were resting on the ground.

The structure of this reference roadway, which can be found in the LCPC-SETRA Catalog of Structures dealing with the construction of new roadways, was as follows:

- one 14 cm thick layer of asphalt concrete;
- two layers of cement aggregate, 25 cm and 20 cm thick, respectively;

The intent was to create a mechanically equivalent roadway by using, according to the invention, a very hard asphalt in the preparation of the road asphalt (indicated by $E_1$) acting as the roadbed foundation layer.

Road asphalt $E_1$ was prepared from:

1) an asphalt acting as binder and having the following properties:
   - penetrability at 25° C. by AFNOR method 66004: 7 tenths of one millimeter;
   - softening temperature by AFNOR method NFT 66-008: 90.5° C.;

2) an inorganic material of the Meilleraie materials type with a particle size of 0/14 as measured by test method P 18101 and which had the following formulation:

| 42% of sand | 0/2 |
| 10% of fine gravel | 2/4 |
| 10% of fine gravel | 4/6 |
| 13% of fine gravel | 6/10 |
| 23% of fine gravel | 10/14 |
| 2% of a filler | |

Road asphalt $E_1$ thus prepared had the following properties:

- modulus of rigidity at 15° C. and 10 Hz: $25 \times 10^3$ MPa;
- real density by test method NFT 98-140: 2.61 g/cm$^3$;
- selected modulus of "richness": 4.04, corresponding to an asphalt content in the road asphalt of 6.5 wt %, determined by test method NFP 98-140.

The roadway consisted of one top layer of asphalt concrete applied to a layer of road asphalt $E_1$, which was applied to a layer of bituminous sand which in turn was resting on the ground.

The optimization of the thicknesses of road asphalt $E_1$ needed for the construction of this road was achieved by modeling using the ALIZE III program of the Laboratoire Central des Ponts et Chaussees (abbreviation: L.C.P.C.). The values used for dimensioning this road were as follows:

- one 14 cm thick layer of asphalt concrete;
- one course of road asphalt $E_1$ made up of two layers, one 10 cm and the other 12 cm thick;
- one 2 cm thick layer of bituminous sand.

These results show that to construct a road equivalent to conventional structures proposed in the LCPC-SETRA Catalog of Structures, it is possible to use, according to the invention, asphalt $B_1$ for the preparation of road asphalt $E_1$ intended for the road foundation layer. Said road asphalt can thus replace the materials treated with hydraulic binders used until now, and it also has the advantage that much lower quantities thereof are needed. Thus, by using said road asphalt, the overall thickness of the road can be reduced markedly.

EXAMPLE 2

The purpose of this example is to illustrate the use according to the invention of a very hard asphalt in the preparation of a road asphalt intended as foundation material and, more particularly, for the strengthening of an existing road.

The strengthening of the foundation layer of a roadway was carried out by use of the following materials: one top layer of asphalt concrete applied to a layer of cement aggregate (material treated with a hydraulic binder) which was applied to the old roadway and this in turn was resting on the ground.

The structure of this reference roadway, which can be found in the LCPC-SETRA Catalog of Structures, was as follows:

- one 8 cm thick layer of asphalt concrete;
- one 25 cm thick layer of cement aggregate; resting on
- a 25 cm thick layer of old roadway.

The goal was to strengthen this roadway by using, according to the invention, the very hard asphalt $B_1$ described in Example 1 in the preparation of road asphalt $E_1$ used as replacement for the foundation layer of cement aggregate.

Road asphalt $E_1$ was prepared as in Example 1.

The strengthening of the roadway was carried out as follows: one top layer of asphalt concrete was applied to one layer of road asphalt $E_1$ which was applied on top of the old roadway which in turn was resting on the ground.

The optimization of the thicknesses of road asphalt $E_1$ required to strengthen the roadway was achieved by modeling using L.C.P.C.'s ALIZE III program. The values used for dimensioning this roadway were as follows:
- one 8 cm thick layer of asphalt concrete;
- one 13 cm thick layer of road asphalt $E_1$; which rested on
- a 25 cm thick layer of old roadway.

These results show that to strengthen a roadway in a manner equivalent to that proposed in the LCPC-SETRA Catalog of Structures, it is possible to use, according to the invention, asphalt $B_1$ for the preparation of road asphalt $E_1$ intended for the road foundation layer.

Said road asphalt can thus replace the materials treated with hydraulic binders used until now, and it also has the advantage that it is used in much lower quantities than said materials. Thus, by use of this road asphalt, the overall thickness of the roadway can be reduced markedly.

EXAMPLE 3

The purpose of this example is to show that the performance in terms of rutting resistance and resistance to stripping by water of road asphalt $E_1$ prepared according to the invention is comparable to that of road asphalts of the prior art used as roadbed foundation layers.

Road asphalt $E_1$ was prepared as in Example 1.

The asphalt aggregate of the prior art selected for comparison with road asphalt $E_1$ was a road asphalt of the asphalt aggregate type (referred to as GB) the properties of which are given in standard NFT-98-138 and which contained:

1. an asphalt (referred to as B') acting as binder and having the following properties:
   - penetrability at 25° C. by AFNOR method 66-004: 40 tenths of one millimeter;
   - softening point by AFNOR method NFT 66-008: 54° C.;

2. an inorganic material of the Meilleraie materials type having a particle size of 0/14 by test method P18101 and the following formulation:

| | |
|---|---|
| 42% of sand | 0/2 |
| 10% of fine gravel | 2/4 |
| 10% of fine gravel | 4/6 |
| 13% of fine gravel | 6/10 |
| 23% of fine gravel | 10/14 |
| 2% of a filler | |

Road asphalt GB thus prepared had the following properties:
- real density as per NFT method 98-138: 2.62 g/cm$^3$;
- modulus of "richness": 2.8, corresponding to a 4.25 wt % binder content in the road asphalt.

The following tests were carried out on road asphalt $E_1$ prepared according to the invention and on road asphalt GB:

a) rutting at 60° C. after 30,000 cycles, by NFT method 98-253-1;

b) resistance to stripping by water, determined by measuring the resistance to crushing at 18° C. after immersion in water and compression in accordance with the DURIEZ method, in accordance with NFT method 98-251-1.

The results obtained for the two road asphalts are presented in the following TABLE I.

TABLE I

| PROPERTIES | Road Asphalt $E_1$ | Road Asphalt GB |
|---|---|---|
| Average rut depth (mm) after 30,000 cycles | 1.8 | 2.0 |
| Immersion-compression ratio at 18° C. (MPa) | 1.0 | 0.90 |

The results presented in Table 1 show that the performance of road asphalt $E_1$, prepared according to the invention, in terms of rutting resistance and resistance to stripping by water is as high as that of road asphalt GB.

EXAMPLE 4

The purpose of this example is to show that the performance of road asphalt $E_1$ prepared according to the invention is at least comparable to that of prior-art materials used as roadbed foundation layers, particularly as regards the rigidity properties of the hydraulic materials of the slag aggregate or cement aggregate type.

Road asphalt $E_1$ according to the invention was prepared as in Example 1.

The prior-art hydraulic material of the slag aggregate or cement aggregate type, chosen for the comparison with road asphalt $E_1$, was a cement aggregate (referred to as GC).

The following tests were carried out on road asphalt $E_1$ prepared according to the invention and on material GC:

a) direct tensile strength measurement at 15° C. and at an extension rate of 1 mm/min, by the aforesaid TOTAL test method involving the determination of the thickness of the foundation layer of road asphalt of very high modulus from the values of $\sigma_6$ obtained by determining the fatigue resistance at an applied stress (as indicated in the foregoing, "$\sigma_6$" is the stress applied to the road asphalt by traction-compression causing rupture of said road asphalt after $10^6$ cycles at 15° C. and 25 Hz).

b) fatigue resistance determination at an applied stress at 15° C. and 25 Hz, to measure the stress at break $\sigma_6$ of the road asphalt after $10^6$ traction-compression cycles, by NFP method 98-261-1.

c) determination of the modulus of rigidity at 15° C. and 10 Hz.

The results obtained for the two road asphalts are presented in the following TABLE II.

TABLE II

| PROPERTIES | Road Asphalt $E_1$ | Cement Aggregate GC |
|---|---|---|
| Tensile strength $\sigma_R$ (MPa) | 4.56 | After 7 days: 0.51<br>After 360 days: 1.88 |
| Stress at break, $\sigma_6$ (MPa) | 1.5 | 0.9 |
| Modulus of rigidity (MPa) | $25 \times 10^3$ | $25 \times 10^3$ |

The results of Table II show that the direct tensile strength of road asphalt $E_1$ prepared according to the invention is much higher than that of material GC even after said material has attained its optimum value after 360 days. Note also that road asphalt $E_1$ shows high performance immediately, unlike material GC which needs several months of setting.

These results also show that the rigidity of road asphalt $E_1$ is as good as that of material GC and that road asphalt $E_1$, unlike material GC, has a high fatigue resistance.

What is claimed is:

1. Road asphalt comprising a composition of mineral aggregate and of more than 6.5 wt % of an asphalt with a penetrability at 25° C. from 0 to 20 and with a modulus of rigidity at 15° C. and 10 Hz greater than $24 \times 10^3$ MPa.

2. Road asphalt according to claim 1, having a fatigue resistance at an applied stress such that the value of $\sigma_6$ at 15° C. and 25 Hz is from 1 MPa to 2.5 MPa.

3. Road asphalt according to claim 1, having a modulus of "richness" from 3.8 to 4.5.

4. Road asphalt according to claim 1, having a compactness greater than 95%.

5. Road asphalt according to claim 1, further comprising having been prepared by blending asphalt and the mineral aggregate at a temperature from 180° to 200° C.

6. Road asphalt according to claim 1, having a fatigue resistance at an applied stress such that the value of $\sigma_6$ at 15° C. and 25 Hz is from 1 MPa to 2.5 MPa, having a modulus of "richness" from 3.8 to 4.5., and having a compactness greater than 95%.

7. Road asphalt according to claim 1, having a modulus of rigidity at 15° C. and 10 Hz greater than $25 \times 10^3$ MPa.

8. Method of preparing a road asphalt with a modulus of rigidity greater than $24 \times 10^3$ MPa, comprising blending mineral aggregate with a very hard asphalt having a penetrability at 25° C. from 0 to 20 and in an amount to give an asphalt content of the road asphalt greater than 6.5 wt %.

9. Method according to claim 8, wherein the asphalt content of the road asphalt is from 6.5 to 8 wt %.

10. Method according to claim 9, wherein said asphalt has a penetrability from 0 to 10.

11. Method according to claim 10, wherein the road asphalt has a fatigue resistance at an applied stress such that the value of $\sigma_6$ at 15° C. and 25 Hz is from 1 MPa to 2.5 MPa, having a modulus of rigidity at 15° C. and 10 Hz greater than $24 \times 10^3$ MPa, having a modulus of "richness" from 3.8 to 4.5., and having a compactness greater than 95%.

12. Method according to claim 8, wherein the asphalt is a natural asphalt.

13. Method according to claims 8, wherein the asphalt is a synthetic asphalt.

14. Method of forming a road foundation in roadway construction, comprising laying down a layer of a road asphalt with a thickness of less than 30 cm, said road asphalt having a composition of mineral aggregate and of more than 6.5 wt % of an asphalt with a penetrability at 25° C. from 0 to 20 and with a modulus of rigidity at 15° C. and 10 Hz greater than $24 \times 10^3$ MPa.

15. Method according to claim 14 wherein said road asphalt has a thickness from 5 to 20 cm.

16. Method according to claim 14, wherein said road asphalt has a fatigue resistance at an applied stress such that the value of $\sigma_6$ at 15° C. and 25 Hz is from 1 MPa to 2.5 MPa.

17. Method according to claim 14, wherein said road asphalt has a modulus of "richness" from 3.8 to 4.5.

18. Method according to claim 14, wherein said road asphalt has a compactness greater than 95%.

19. Method according to claim 14, wherein said road asphalt has a fatigue resistance at an applied stress such that the value of $\sigma_6$ at 15° C. and 25 Hz is from 1 MPa to 2.5 MPa, having a modulus of "richness" from 3.8 to 4.5., and having a compactness greater than 95%.

20. Method of forming a road foundation in roadway construction according to claim 14, wherein said road foundation has a modulus of rigidity at 15° C. and 10 Hz greater than $25 \times 10^3$ MPa.

* * * * *